United States Patent [19]

Kamishima

[11] Patent Number: 5,646,959
[45] Date of Patent: Jul. 8, 1997

[54] TERMINAL ADAPTER CAPABLE OF REDUCING A MEMORY CAPACITY OF A BUFFER MEMORY

[75] Inventor: Yoshiyuki Kamishima, Tokyo, Japan

[73] Assignee: NEC Corporation, Japan

[21] Appl. No.: 302,544

[22] Filed: Sep. 8, 1994

[30] Foreign Application Priority Data

Sep. 9, 1993 [JP] Japan .................................... 5-224325

[51] Int. Cl.$^6$ ............................ H04B 1/66; H04B 14/06; H04L 23/00
[52] U.S. Cl. .......................... 375/240; 375/249; 375/377; 348/384
[58] Field of Search ...................... 375/240, 249, 375/377; 370/84; 382/56; 358/404, 426; 348/384, 390

[56] References Cited

U.S. PATENT DOCUMENTS 5,162,838 11/1992 Inuzuka et al. .................. 358/440
5,204,949 4/1993 Yasue et al. ..................... 370/112

FOREIGN PATENT DOCUMENTS 2051825 5/1992 Canada .

OTHER PUBLICATIONS

Patent Abstract of Japan, vol. 014, No. 537 (E-1006), 27 Nov. 1990; JP-A-02 228156, Sep. 11, 1990.

Hans J. Busschaert, et al., "A Viable Multi Standard Rate Adapter Chip for ISDN Communications"; Electronic Circuits and Systems for Communication, ETH Zurich, Mar. 5-8, 1990; No. 5, Mar. 1990, pp. 231-242.

Primary Examiner—Stephen Chin
Assistant Examiner—Hai H. Phan
Attorney, Agent, or Firm—Ostrolenk, Faber, Gerb & Soffen, LLP

[57] ABSTRACT

In a terminal adapter which is located between a data terminal equipment unit (11) and a data communication network (12) and which includes a buffer memory (22, 27) for memorizing an original data signal sequence sent from each of the data terminal equipment unit and the data communication network, the original data signal sequence is subjected to data compression by a data compression circuit to be thereafter memorized into the buffer memory and to be read out of the buffer memory as a readout data signal sequence. The readout data signal sequence is expanded by a data expansion circuit (32, 35) to be sent to the data terminal equipment unit or the data communication network at a transmission rate matched therewith. The data compression may be executed by the use of an LZ method, a modified LZ method, such as LZW, LZSS, or the like.

22 Claims, 7 Drawing Sheets

FCS : FRAME CHECK SEQUENCE

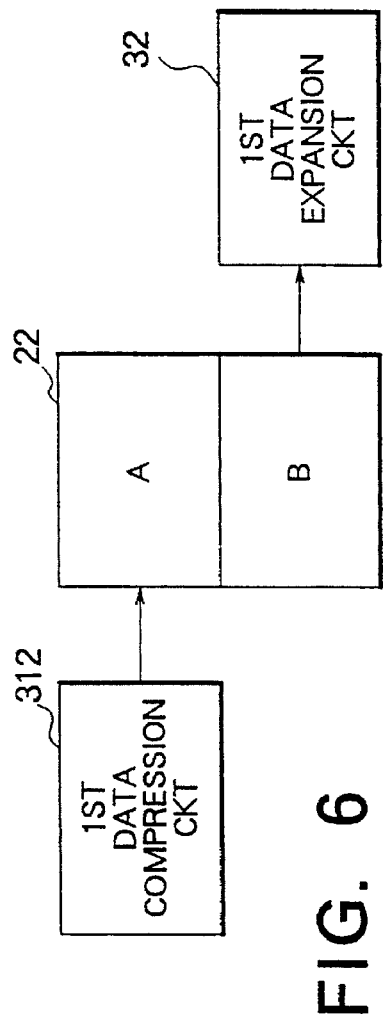

| 1 | 2 | 3 | 4 | 5 | 6 | 7 | 8 |
|---|---|---|---|---|---|---|---|
| A | B | BA | AA | AB | ABB | BAA | BBA | B |

(B)

| TABLE | CONTENT |
|-------|---------|
| T1 | A |
| T2 | B |
| T3 | T2+A |
| T4 | T1+A |
| T5 | T1+B |
| T6 | T5+B |
| ... | ... |

FIG. 9

CHARACTERS: A | B | B | A | A | A | A | B | A | B | B | A | ......

TABLE NOS. & CONTENTS: 3, 4, 5, 6, 7, 8, 9, 10

TERMINAL ADAPTER CAPABLE OF REDUCING A MEMORY CAPACITY OF A BUFFER MEMORY

BACKGROUND OF THE INVENTION

This invention relates to a terminal adapter between a data terminal equipment (DTE) unit and a data communication network, such as a integrated services digital network (ISDN). It is to be noted that the terminal adapter is usually used to match transmission rates between the data communication network and the data terminal equipment unit with each other.

According to the definition (I.112) of CCITT recommendations, ISDN is defined as a network which establishes digital connections between users and network interfaces and which can execute integrated services. This means that a wide variety of communication or information processing services can be provided by the use of a single digital network. Herein, such communication services may be telephone, data, and facsimile communication services while information processing services may be for processing various kinds of information. As known in the art, packet communication is usually executed in the ISDN.

In addition, a specification is defined in the CCITT recommendation 1.430 as regards a first layer between basic users and network interfaces. Specifically, the specification prescribes electric and physical conditions between users and the network interfaces. In other words, the recommendation is directed to a basic interface basically used in the ISDN and a first-order group interface which is for carrying out a multiplex access and a high speed access and which is considered to be used in companies or the like.

Herein, a summary will be described hereinunder only about the specification of the basic interface related to the instant invention. Namely, the specification prescribes an interface rate of 192 Kbit/s (namely, Kbps), two B channels (64 Kbps) for transmission of user information, and a single D channel (16 Kbps) for controlling a network. This shows that signalling information is transmitted through the D channel.

In the meanwhile, it is to be noted that transmission rates between the network and the data terminal equipment (DTE) unit should be matched with each other so as to carry out communication therebetween by the use of the packet communication executed in the ISDN or the like.

For example, the transmission rate on the network side of the ISDN is equal to 64 Kbps in the B channel and 16 Kbps in the D channel, as mentioned above, while the transmission rate on the data terminal equipment unit side is equal to 9.6 Kbps and is slower than that on the network side. Taking this into account, a terminal adapter is located between the network and the data terminal equipment (DTE) unit to match the transmission rates with each other and is therefore structured by a rate matching circuit which is operated in accordance with a flag stuff rate matching method prescribed in the CCITT recommendation X.31.

In any event, such a rate matching circuit in a DTE unit must include a couple of buffer memories for storing a plurality of packets sent from the network and the data terminal equipment unit, respectively.

Practically, let packet data communication is carried out in the ISDN by the use of the B channel of which a maximum packet length becomes equal to 4096 bytes or octets. In this case, each buffer memory must have a memory region for storage of a current packet and another memory region for storage of a next following packet. In other words, each buffer memory must have a memory capacity of 2×4096 bytes (8192 bytes). This means that a total memory capacity of the buffer memories should have a total memory capacity which is greater than 16,384 bytes.

Moreover, when several packets should be memorized in each buffer memory so as to be processed in the terminal adapter, the memory capacity should be inevitably increased with an increase of the packets to be stored in the buffer memories.

SUMMARY OF THE INVENTION

It is an object of this invention to provide a terminal adapter which is capable of reducing a memory capacity of buffer memories included therein.

It is another object of this invention to provide a terminal adapter of the type described, which is operable in a code compression algorithm suitable for a reduction of the memory capacity.

It is still another object of this invention to provide a terminal adapter of the type described, which is pertinent to packet communication in an ISDN.

A terminal adapter to which this invention is applicable is located between a data terminal equipment unit and a data communication network. The terminal adapter is operable to receive a sequence of first data signals at a first transmission rate from the data terminal equipment unit to transmit a sequence of first network data signals to the data communication network at a second transmission rate greater than the first transmission rate. According to an aspect of this invention, the terminal adapter comprises a preprocessing circuit supplied with the first data signal sequence for preprocessing the first data signal sequence into a sequence of first preprocessed signals, signal compression means for compressing the first preprocessed signal sequence into a sequence of compressed signals in accordance with a predetermined compression algorithm, a buffer memory for memorizing said compressed signal sequence, controllable signal expansion means coupled to the buffer memory for expanding the compressed signal sequence read out of the buffer memory to produce a sequence of expanded signal sequences at the second transmission rate, and a post-processing circuit supplied with the expanded signal sequence for post-processing the expanded signal sequence to produce a sequence of first post-processed signals as the first network data signal sequence.

According to another aspect of this invention, the terminal adapter is operable to receive a sequence of network data signals at a network transmission rate from the data communication network to transmit a sequence of terminal data signals at a terminal transmission rate slower than the network transmission rate. The terminal adapter comprises a preprocessing circuit supplied with the network data signal sequence for preprocessing the network data signal sequence into a sequence of preprocessed signals having said network transmission rate, signal compression means for compressing the preprocessed signal sequence into a sequence of compressed signals in accordance with a predetermined compression algorithm, a buffer memory for memorizing the compressed signal sequence, controllable signal expansion means coupled to the buffer memory for expanding the compressed signal sequence read out of the buffer memory to produce a sequence of expanded signal sequences at the terminal transmission rate, and a post-processing circuit supplied with the expanded signal sequence for post-processing the expanded signal sequence to produce a sequence of post-processed signals as the terminal data signal sequence.

According to still another aspect of this invention, a terminal adapter is operable to receive a sequence of first terminal data signals at a first transmission rate from the data terminal equipment unit to transmit a sequence of first network data signals to the data communication network at a second transmission rate greater than the first transmission rate. The terminal adapter is also operable to receive a sequence of second network data signals at the second transmission rate from the data communication network to transmit a sequence of second terminal data signals to the data terminal equipment unit at the first transmission rate. The terminal adapter comprises a first preprocessing circuit supplied with the first terminal data signal sequence for preprocessing the first terminal data signal sequence into a sequence of first preprocessed signals, first signal compression means for compressing the first preprocessed signal sequence into a sequence of first compressed signals in accordance with a predetermined compression algorithm, a first buffer memory for memorizing the first compressed signal sequence, first controllable signal expansion means coupled to the first buffer memory for expanding the first compressed signal sequence read out of the first buffer memory to produce a sequence of first expanded signals at the second transmission rate, and a first post-processing circuit supplied with the first expanded signal sequence for post-processing the first expanded signal sequence to produce a sequence of first post-processed signals as the first network data signal sequence. The terminal adapter further comprises a second preprocessing circuit supplied with the second network data signal sequence for preprocessing the second network data signal sequence into a sequence of second preprocessed signals, second signal compression means for compressing the second preprocessed signal sequence into a sequence of second compressed signals, a second buffer memory for memorizing the second compressed signal sequence, second controllable signal expansion means coupled to the second buffer memory for expanding the second compressed signal sequence read out of the second buffer memory to produce a sequence of second expanded signal at the first transmission rate, and a second post-processing circuit supplied with the second expanded signal sequence for post-processing the second expanded signal sequence to produce a sequence of second post-processed signals as the second terminal data signal sequence.

BRIEF DESCRIPTION OF THE DRAWING

FIG. 6 shows a block diagram for use in describing an access method of a buffer memory included in the terminal adapter illustrated in FIG. 2;

FIGS. 7(A) and 7(B) show a character sequence and a table for describing an adaptive compression method which is applicable to the terminal adapter illustrated in FIG. 2;

FIGS. 8(A) and 8(B) show a character sequence and a table for describing another adaptive compression method which is also applicable to the terminal adapter illustrated in FIG. 2; and FIG. 9 shows a diagram for describing a further adaptive compression method applicable to the terminal adapter illustrated in FIG. 2.

DESCRIPTION OF THE PREFERRED EMBODIMENT

Figure 1:
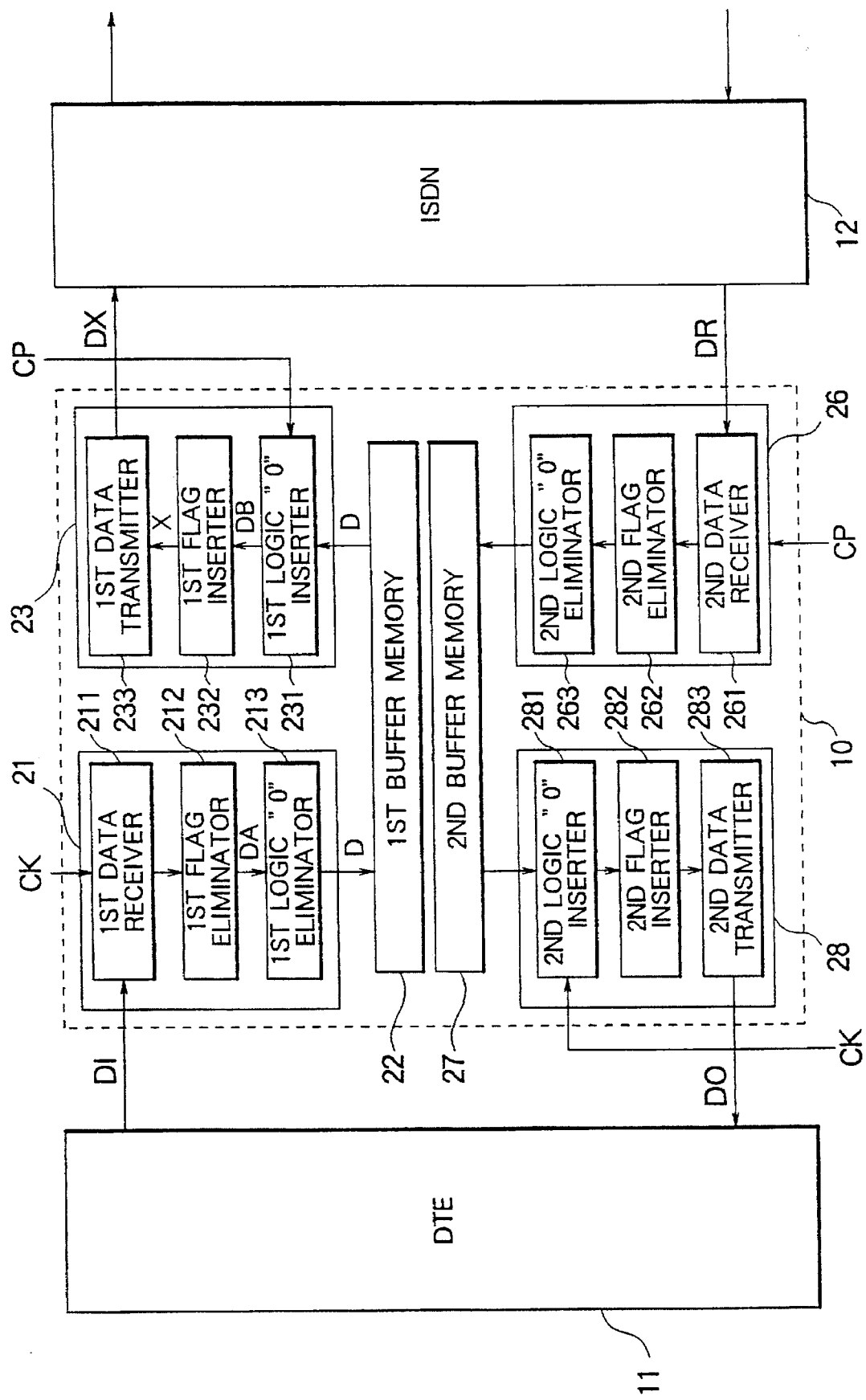
FIG. 1 shows a block diagram of a convention terminal adapter together with a data terminal equipment unit and a network.

Referring to FIG. 1, description will be at first made for a better understanding of this invention as regards a conventional terminal adapter 10 located between a data terminal equipment (DTE) unit 11 and an integrated services digital network (ISDN) 12.

It is assumed that a flag stuff rate matching method is used in the illustrated terminal adapter 10, as mentioned in a preamble of the instant specification. As shown in FIG. 1, the terminal adapter 10 comprises a first section supplied with a first terminal data packet DI from the DTE unit 11 to send a first network data packet DX to the ISDN 12 and a second section supplied with a second network data packet DR to send a second terminal data packet DO to the DTE unit 11.

Each of the first and the second terminal data packets DI and DO is composed of a sequence of terminal data signals which may be called a serial terminal coded data signal and which is transmitted at a first transmission rate of 9.6 Kbps. The terminal data signal sequences of the first and the second terminal data packets DI and DO may be referred to as first and second terminal data signal sequences, respectively.

Likewise, each of the first and the second network data packets DX and DR is composed of a sequence of network data signals which may be called a serial network data signal and which has a second transmission rate of 64 Kbps. The network data signal sequences of the first and the second network data packets DX and DR may be referred to as first and second network data signal sequences, respectively.

It is to be noted that each of the terminal and the network data packets DI, DO, DR, and DX is specified by a similar frame which has a start flag byte at a leading portion of each frame, an end flag byte at a trailing portion thereof, and an intermediate portion between the start and the end flag bytes. Each of the start and the end flag bytes is similar in structure to each other and is specified by a flag pattern of "01111110" which is a combination of a pair of zeros and a concatenation of six "1" bits. In order to distinguish between the start and the end flag bytes and the remaining data bytes, a single zero bit is forcibly added to a concatenation of five "1" bits in each of the terminal and the network data packets DI, DO, DX, and DR.

Now, description will be made about the illustrated terminal adapter 10, taking the above into account.

The first section comprises a first preprocessing circuit 21, a first buffer memory 22, and a first post-processing circuit 23. Specifically, the first preprocessing circuit 21 comprises a first data receiver 211 which receives the first terminal data packet DI in timed relation to a sequence of first clock pulses CK having a repetition frequency of 9.6 Kbps to produce a first received terminal data packet. The first received terminal data packet is sent to a first flag eliminator 212 to eliminate each of the start and the end flags therefrom to be produced as a flag free terminal data packet DA.

Since the zero bit is added to the concatenation of five "1" bits in the flag free terminal data packet DA, as mentioned above, such a zero bit is removed from the flag free terminal data packet DA by a first logic "0" eliminator 213. As a result, a first original data signal sequence D alone is sent from the first logic "0" eliminator 213 to the first buffer memory 22 and is stored in the first buffer memory 22 as a write-in signal sequence.

The first original data signal sequence D for a single terminal data packet is memorized in the first buffer memory 22 and is read out of the first buffer memory 22 in synchronism with a sequence of second clock pulses CP having a repetition frequency of 64 Kbps and is sent to the first post-processing circuit 23 as a first readout original data signal sequence D.

In the first post-processing circuit 23, the first readout original data signal sequence D is received by a first logic "0" inserter 231 to insert a logic "0" bit each time when a concatenation of the five logic "1" bits appears in the first readout original data signal sequence D. Consequently, the first logic "0" inserter supplies a first flag inserter 232 with a first zero-inserted data signal sequence DB. The first flag inserter 232 adds the start and the end flags before and after the first zero-inserted data signal sequence DB and produces a first flag-added data signal sequence X. The first flag-added data signal sequence X is supplied to a first data transmitter 233 and sent to the ISDN 12 as the first network data packet DX at a second transmission rate of 64 Kbps.

The second network data packet DR is supplied from the ISDN 12 to the second section of the terminal adapter 10. The second section comprises a second preprocessing circuit 26, a second buffer memory 27, and a second post-processing circuit 28.

In the second preprocessing circuit 26, the second network data packet DR is received as a second received network data packet by a second data receiver 261 in synchronism with the second clock pulses CP of 64 Kbps. The second received network data packet is delivered from the second data receiver 261 to a second flag eliminator 262 which is operable in a manner similar to the first flag eliminator 212 to eliminate the start and the end flags from the second received network data packet. Thus, the second flag eliminator 262 supplies a second logic "0" eliminator 263 with a second flag-free network data packet. The second logic "0" eliminator 263 eliminates the logic "0" bit from the second flag-free network data packet in a manner similar to the first logic "0" eliminator 213 each time when the concatenation of the five logic "1" bits. As a result, the second buffer memory 27 is loaded with a second original data signal sequence DC in synchronism with the clock pulses CP of 64 Kbps.

When the second original data signal sequence DC for a single packet is stored as a write-in signal sequence in the second buffer memory 27, the second original data signal sequence is read out of the second buffer memory 27 as a second readout original data signal sequence at the first transmission rate of 9.6 Kbps and is sent to the second post-processing circuit 28.

In the second post-processing circuit 28, the second readout original data signal sequence is received by a second logic "0" inserter 281 to insert a zero bit each time when a concatenation of five "1" bits appears in the second readout original data signal sequence, like in the first logic "0" inserter 231. Consequently, a second zero-inserted data signal sequence is produced by the second logic "0" inserter 281 and is sent to a second flag inserter 282. In the second flag inserter 282, the start and the end flag bytes are added at the beginning and the end of the second zero-inserted data signal sequence, respectively, to be sent to a second data transmitter 283. Thus, the second data transmitter 283 forms the second terminal data packet DO and transmits the same to the data terminal equipment (DTE) unit 11 at the first transmission rate of 9.6 Kbps.

As mentioned above, the first and the second transmission rates are matched with each other on the DTE side and the ISDN side by the use of the first and the second buffer memories 22 and 27. In this event, each of the first and the second buffer memories 22 and 27 should have a memory capacity for memorizing at least two packets each of which has a maximum packet length of 4096 bytes. Therefore, each of the first and the second buffer memories 22 and 27 should have a large capacity, as mentioned in the preamble of the instant specification.

Figure 2:
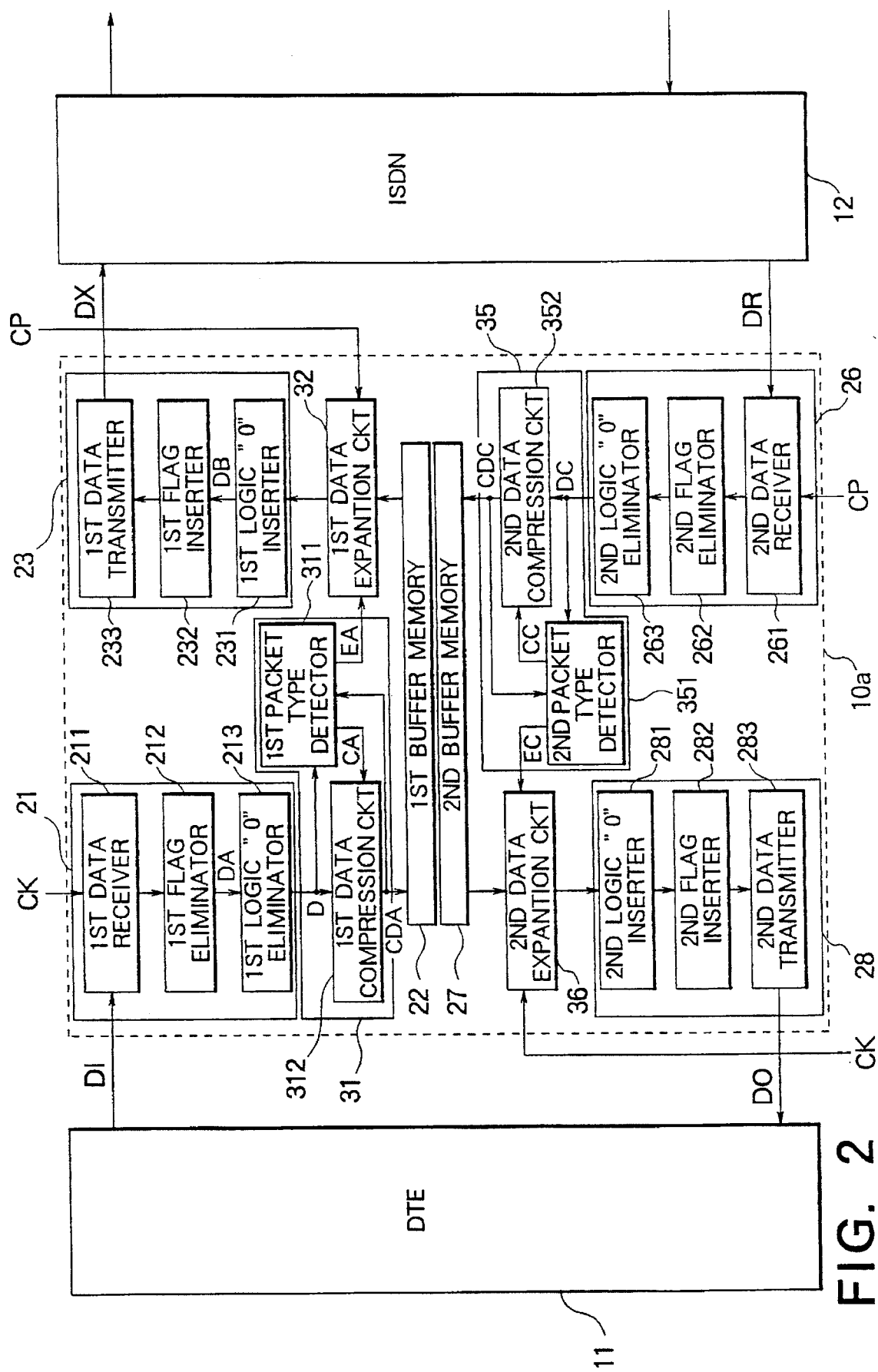
FIG. 2 shows a block diagram of a terminal adapter according to a preferred embodiment of this invention.

Referring to FIG. 2, a terminal adapter 10a according to a preferred embodiment of this invention comprises similar parts designated by like reference numerals and symbols. Like in FIG. 1, the illustrated terminal adapter 10a is supplied with the first terminal data packet DI to produce the first network data packet DX and is also supplied with the second network data packet DR to produce the second terminal data packet DO. In addition, the first preprocessing circuit 21, the first buffer memory 22, the first post-processing circuit 23, the second the second processing circuit 26, the second buffer memory 27, and the second post-processing circuit 28 are also included in the illustrated terminal adapter 10a and are similar in structure and operation to those illustrated in FIG. 1. Therefore, detailed description will be omitted in connection with the above-mentioned circuits hereinunder.

As illustrated in FIG. 2, the terminal adapter 10a comprises a first data compression unit 31 between the first logic "0" eliminator 213 of the first preprocessing circuit 21 and the first buffer memory 22 and a first data expansion circuit 32 between the first logic "0" inserter 231 of the first post-processing circuit 23 and the first buffer memory 22.

Likewise, a second data compression unit 35 is located between the second logic "0" eliminator 263 of the second preprocessing circuit 26 and the second buffer memory 27 while a second data expansion circuit 36 is located between the second buffer memory 27 and the second logic "0" inserter 281 of the second post-processing circuit 28.

In the meanwhile, description will be directed to a packet format of each of the data packets, such as DI, DX, DO, and DR, for a better understanding of this invention.

Figure 3:
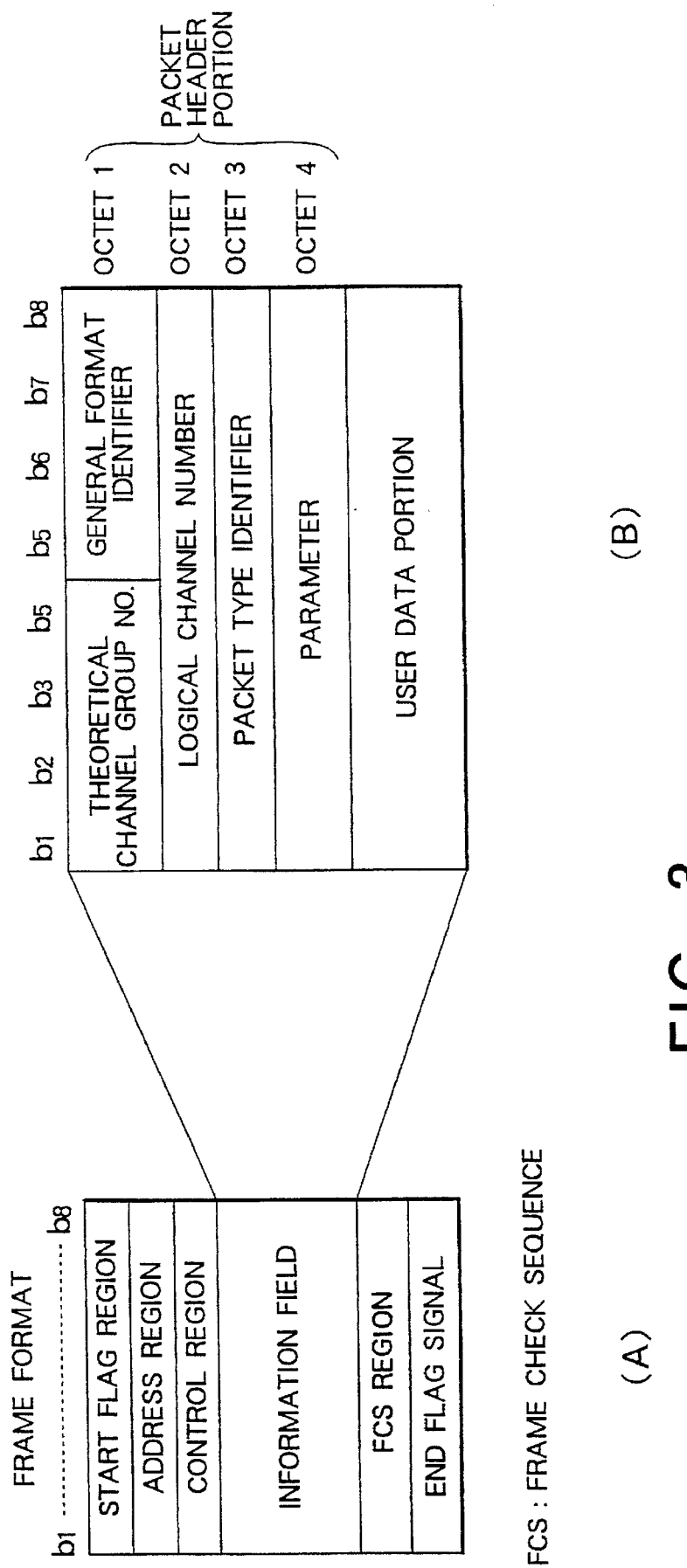
FIGS. 3(A) and 3(B) show a frame format and an information field of a packet which is received by and transmitted from the terminal adapter illustrated in FIG. 2.

Temporarily referring to FIG. 3(A) and (B), the packet format of each data packet is shown which is prescribed in CCITT recommendation X.25 and which may be considered as a packet frame. As illustrated in FIG. 3(A), the packet format has a start flag region at a leading portion thereof and an end flag region at an end portion thereof. In the start and the end flag regions, the start and the end flag bytes of eight bits depicted at b1 to b8 are arranged, as mentioned before. In addition, an address region, a control region, an information field, and a frame check sequence (FCS) region are arranged between the start and the end flag regions. It is to be noted that the address region has a length equal to two octets while the control region has a length equal to a single octet in the illustrated example.

As shown in FIG. 3(B), the information field is formed by a packet header portion and a user data portion. The packet header portion has first, second, and third octet portions. In the packet header portion, a general format identifier and a theoretical channel group number are arranged in the first octet portion while a logical channel number and a packet type identifier are arranged in the second and the third octet portions, respectively. Moreover, lengths of a calling address and a destination address, a facility, and a facility length are indicated as parameters in a fourth octet and the following octet or octets.

Thus, the packet type identifier is located within a sixth octet when the octet is counted from the address region.

In the user data portion, a packet is arranged which is classified into a data (DT) packet transferred between data terminal equipments, a receive ready (RR) packet for notifying a receive ready state of a data packet, and the others. In any event, it is to be noted that the data (DT) packet is 4096 octets long at maximum while the receive ready (RR) packet includes only the packet header portion and has no user data portion. The packet type identifier serves to distinguish between the DT and the RR packets.

Referring back to FIG. 2, the first signal compression unit 31 comprises a first packet type detector 311 for detecting that the packet type identifier in the sixth octet of the packet header portion (FIGS. 3(A) and 3(B)) identifies the DT or the RR packet. In the example being illustrated, the first packet type detector 311 produces a first data compression indication signal CA and a first data expansion indication signal EA when the first packet type detector 311 detects reception of the DT packet in the first original data signal sequence D. The first data compression indication signal CA is supplied to a first data compression circuit 312. The first data compression circuit 312 compresses the first original data signal sequence D into a first compressed data signal sequence CDA in accordance with a predetermined compression algorithm or method only when the first data compression indication signal CA is given from the first packet type detector 311. In other words, no data compression is carried out in the first data compression circuit 312 when the RR packet is received and detected by the first packet type detector 311.

As a result, the first compressed data signal sequence CDA is memorized into the first buffer memory 22 on reception of the DT packet while the RR packet is directly memorized into the first buffer memory 22 without being subjected to compression in the first data compression circuit 352.

Herein, let the first compressed data signal sequence CDA for a single packet be memorized in the first buffer memory 22 and be read out of the first buffer memory 22 as a first readout compressed data signal sequence. The first readout compressed data signal sequence is delivered from the first buffer memory 22 to the first data expansion circuit 32 which is given the first data expansion indication signal EA.

Under the circumstances, the first data expansion circuit 32 expands the first readout compressed data signal sequence as a sequence of first expanded data signals in response to the first data expansion indication signal EA. Consequently, the first readout compressed data signal sequence is reproduced by the first data expansion circuit 32 as the first expanded data signal sequence which has a bit rate or transmission rate of 64 Kbps and which is sent to the first logic "0" inserter 231 of the first post-processing circuit. In the first post-processing circuit 23, the logic zeros and the start and the end flag bytes are inserted by the first logic "0" inserter 231 and the first flag inserter 232, respectively, in the manner described in conjunction with FIG. 1. As a result, the first network data packet DX is transmitted from the first data transmitter 233 to the ISDN 12.

On the other hand, the first packet type detector 351 produces neither the first data compression indication signal CA nor the first data expansion indication signal EA on detection of the RR packet in the first original data signal sequence D. As a result, the first original data signal sequence D is allowed to pass through the first data compression circuit 312 to be memorized into the first buffer memory 22. In this case, the first data expansion circuit 32 reads the first original data signal sequence out of the first buffer memory 22 at a bit rate of 64 Kbps. Thus, the first original data signal sequence read out of the first buffer memory 22 is sent through the first data expansion circuit 32 to the first post-processing circuit 23 to be processed in a manner similar to that described with reference to the first expanded data signal sequence. Thus, the DT packet alone is subjected to compression and expansion while the RR packet is not subjected to any compression and expansion. This is because the RR packet is as short a length as three or four octets and may not be compressed and expanded. Even if the RR packet is subjected to compression, this is not so effective to reduce a memory capacity in the first buffer memory 22. The first original data signal sequence D read out of the first buffer memory 22 is processed by the first post-processing circuit 23 in the above-mentioned manner to be sent as the first network data packet DX.

Alternatively, the second network data packet DR is sent at the second transmission rate of 64 Kbps from the ISDN 12 to the second preprocessing circuit 26 which comprises the second data receiver 261, the second flag eliminator 262, and the second logic "0" eliminator 263 all of which are operable in the manner mentioned in conjunction with FIG. 1. At any rate, a second original data signal sequence DC is sent to the second data compression unit 35 which comprises a second packet type detector 351 and a second data compression circuit 352 similar in operation and structure to the first packet type detector 311 and the first data compression circuit 312, respectively.

More specifically, the second packet type detector 351 detects that the packet type identifier indicates the DT packet or the RR packet. On detection of the DT packet, the second packet type detector 351 produces a second data compression indication signal CC and a second data expansion indication signal EC. The second data compression indication signal CC is delivered to the second data compression circuit 352 while the second data expansion indication signal EC is sent to a second data expansion circuit 36 which is similar in operation and structure to the first data expansion circuit 32.

Supplied with the second compression indication signal CC, the second data compression circuit 352 compresses the second original data signal sequence DC into a sequence of second compressed data signals CDC in accordance with the predetermined compression algorithm or method. When the second compressed data signal sequence CDC for a single packet is memorized into the second buffer memory 27, the second compressed data signal sequence CDC is read out of the second buffer memory 27 to be sent to the second data expansion circuit 36 as a sequence of second readout compressed data signals.

The second data expansion circuit 36 expands the second readout compressed data signal sequence into a sequence of second expanded data signals in synchronism with the clock pulses of 9.6 Kbps. Thus, the second expanded data signal sequence is reproduced at the bit rate of 9.6 Kbps and is sent to the second post-processing circuit 28 which comprises the second logic "0" inserter 281, the second flag inserter 282, and the second data transmitter 283. In any event, the second terminal data packet DO is sent from the second data transmitter 283 to the data terminal equipment (DTE) unit 11 at the first transmission rate of 9.6 Kbps.

Figure 4:
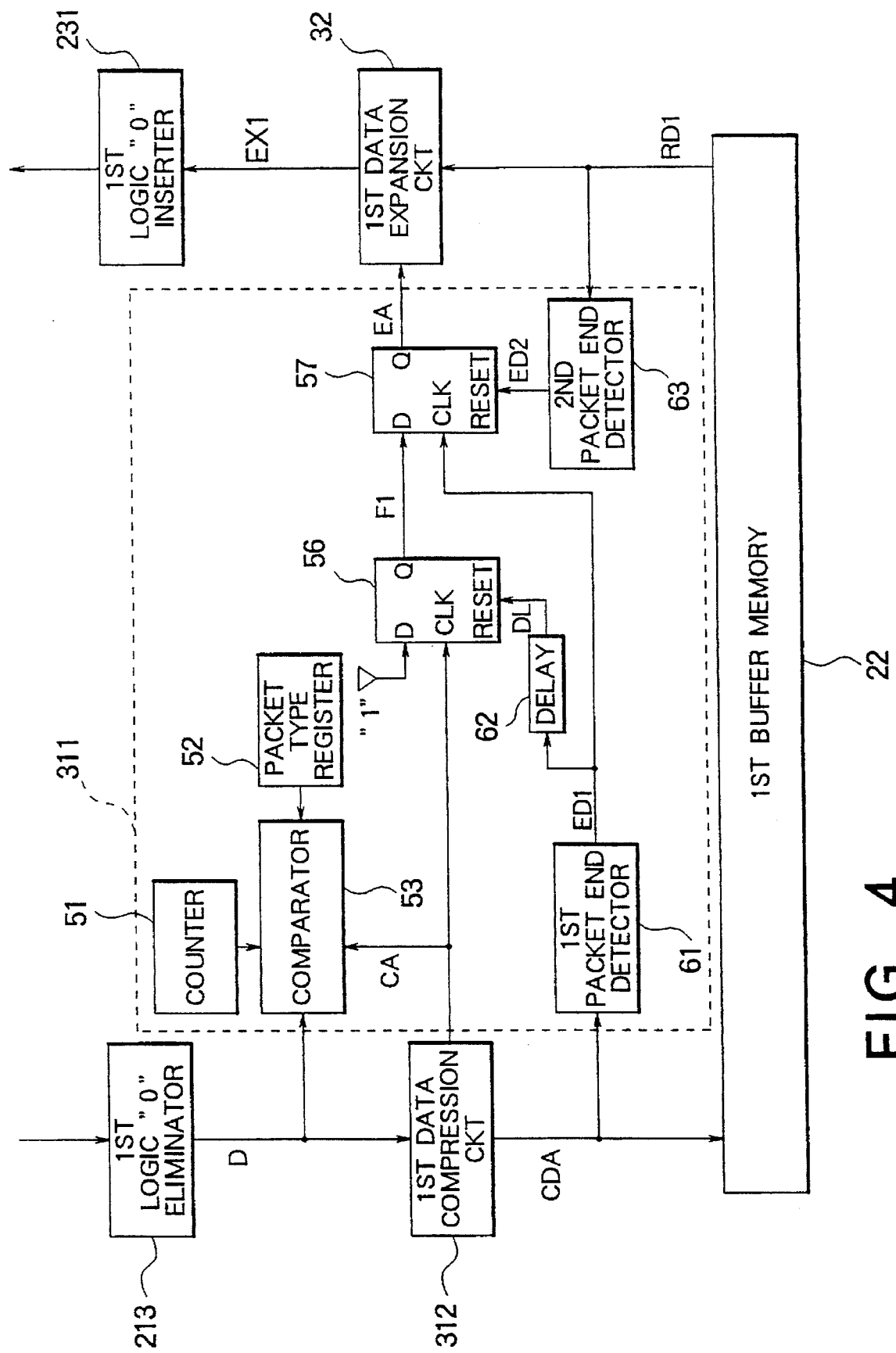
FIG. 4 shows a block diagram for use in describing a packet type detector included in the terminal adapter illustrated in FIG. 2.
Figure 5:
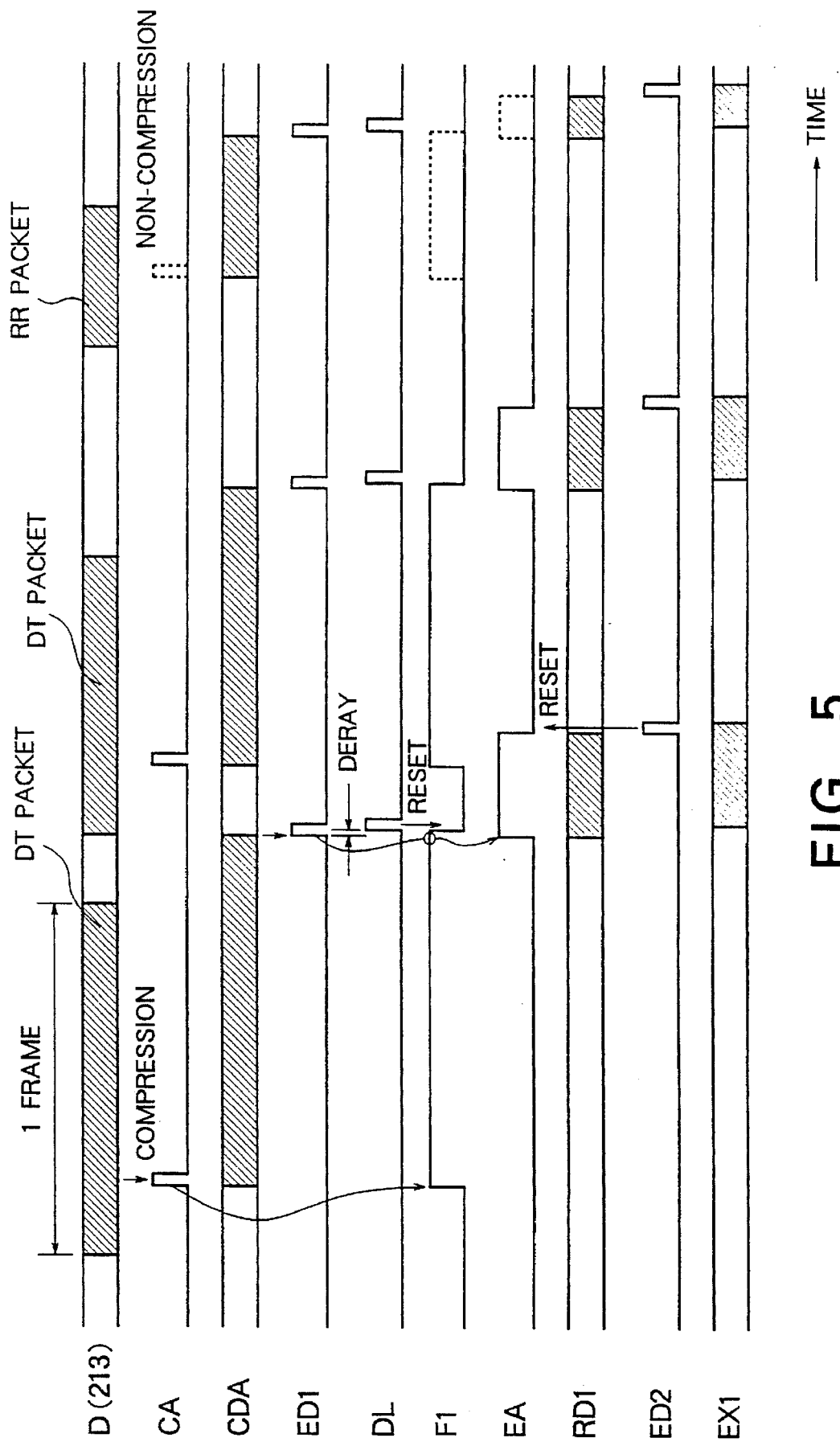
FIG. 5 shows a time chart for use in describing operation of the packet type detector illustrated in FIG. 4.

Referring to FIGS. 4 and 5 together with FIG. 2, description will be made about the first packet type detector 311 (FIG. 2). The first packet type detector 311 is given the first original data signal sequence D and the first compressed data signal sequence CDC from the first logic "0" eliminator 213 and the first data compression circuit 312, respectively.

In FIG. 4, the first packet type detector 311 comprises a counter 51, a packet type register 52, and a comparator 53. The counter 51 successively counts a sequence of clock pulses (not shown) to the sixth octet of the first original data signal sequence D and to supply an enable signal to the comparator 53 while the packet type register 52 holds a packet type identifier assigned to the DT packet. The packet type register 52 may be replaced by a fixed pattern generator for generating the packet type identifier. In this situation, the comparator 53 is put into an enable state for the sixth octet in response to the enable signal. The comparator 53 compares the sixth octet of the first original data signal sequence D with the packet type identifier held in the packet type register 52 to produce the first data compression indication signal CA when the sixth octet is coincident with the packet type identifier.

In FIG. 5, it is assumed that a couple of the DT packets are carried by the first original data signal sequence D and are followed by a single RR packet, as shown along a top line of FIG. 5. As shown along a second line in FIG. 5, the first data compression indication signal CA is produced by the comparator 53. The data compression indication signal CA has a leading edge and a trailing edge and is delivered to the first data compression circuit 312 and a first delay flip-flop 56. The first delay flip-flop 56 has an input terminal D supplied with a logic "1" level signal and a clock terminal CLK given the first data compression indication signal CA, a reset terminal RESET, and an output terminal Q.

Both the first data compression circuit 312 and the first delay flip-flop 56 are put into active states at the leading edge of the first data compression indication signal CA. As a result, the first data compression circuit 312 successively compresses the first original data signal sequence D into the first compressed data signal sequence CDA, as shown along a third line in FIG. 5 in a manner to be described later in detail. On the other hand, the first delay flip-flop 56 is set in response to the leading edge of the first data compression indication signal CA to produce a flip-flop output signal F1 of the logic "1" level, as shown along a sixth line in FIG. 5.

The first delay flip-flop 56 is connected to a second delay flip-flop 57 which has an input terminal D, an output terminal Q, a reset terminal RESET, and a clock terminal CLK, like the first flip-flop 56. As illustrated in FIG. 4, the flip-flop output signal F1 is sent to the input terminal D of the second flip-flop 57 which produces the first data expansion indication signal EA through the output terminal Q in a manner to be described later.

Herein, the first compressed data signal sequence CDA is sent to the first buffer memory 22 on one hand and to a first packet end detector 61 on the other hand. The first packet end detector 61 detects an end of the first compressed data signal sequence CDA to produce a first end signal ED1. The first end signal ED1 is delivered to the reset terminal RESET of the first delay flip-flop 56 through a delay circuit 62 and to the clock terminal CLK of the second delay flip-flop 57 directly.

With this structure, the second delay flip-flop 57 is at first put into a set state in response to a leading edge of the first end signal ED1 to produce the first data expansion indication signal EA because the first delay flip-flop 56 is kept at the set state on reception of the first end signal ED1, as shown along the sixth and seventh lines in FIG. 5. Thereafter, the first flip-flop 56 is reset in response to a delayed signal DL produced by the delay circuit 62, as illustrated along a fifth line of FIG. 5. Consequently, the flip-flop output signal F1 of the first delay flip-flop 56 is put into a reset state, as shown along the sixth line in FIG. 5.

During the first data expansion indication signal EA of the logic "1" level, the first readout compressed data signal sequence (depicted at RD1) is read out of the first buffer memory 22 as a readout data signal sequence to be sent to both a second packet end circuit 63 and the first data expansion circuit 32. As a result, the first data expansion circuit 32 expands the first readout compressed data signal sequence RD1 into the first expanded data signal sequence EX1, as illustrated along a bottom line in FIG. 5. Such a first expanded data signal sequence EX1 lasts until the second packet end detector 63 detects an end of the first readout compressed data signal sequence RD1 and produces a second end signal ED2 as shown along a ninth line in FIG. 5. Thus, the first readout compressed data signal sequence RD1 is expanded by the first data expansion circuit 32 to be produced as the first expanded data signal sequence EX1. This shows that the first data expansion circuit 32 expands the first readout compressed data signal sequence RD1 in the presence of the first data expansion indication signal EA.

Similar operation is carried out as regards the following DT packet illustrated in FIG. 5.

When the RR packet is received by the first packet type detector 311, as shown in FIG. 5, the first data compression indication signal CD is not produced by the comparator 53. Accordingly, the first data compression circuit 312 delivers the first original data signal sequence D to the first buffer memory 22 without compression. As a result, no first data expansion indication signal EA is also given from the second delay flip-flop 57 to the first data expansion circuit 32. The first readout data signal sequence RD1 is passed through the first data expansion circuit 32 to be sent to the first logic "0" inserter 231.

As shown in FIG. 5, each readout compressed or non-compressed data signal sequence is read out of the first buffer memory 22 after each packet is written into the first buffer memory 22. In addition, the first compressed data signal sequence CDA has a reduced amount of information, although a write-in operation time is not shortened, as illustrated in FIG. 5.

In the meanwhile, it is to be noted in FIG. 5 that the following DT packet is memorized or written into the first buffer memory 22 while the first readout compressed data signal sequence RD1 is read out of the first buffer memory 22. In other words, a write-in operation is executed in the first buffer memory 22 simultaneously with a readout operation.

Referring to FIG. 6, the first buffer memory 22 is divided into first and second memory zones A and B in order to simultaneously execute the write-in operation and the read-out operation. Specifically, the first and the second memory zones A and B may be alternately used within a single random access memory by the first data compression circuit 312 and the first data expansion circuit 32. Such alternate use of first and second memory zones A and B is possible by assigning different addresses to the first and the second memory zones A and B. Alternatively, when the first and the second memory zones A and B are implemented by different random access memories as the first buffer memory 22, the first and the second memory zones A and B may be distinguished by chip select signals.

Inasmuch as the second packet type detector 351 is similar in operation and structure to the first packet type detector 311, description will be omitted hereinunder.

Herein, description will be directed to the predetermined compression algorithm or method used in the first and the second data compression circuits 312 and 352 and the first and the second data expansion circuits 32 and 36.

Herein, it is to be noted here that the ISDN should transmit a wide variety of signals which include speech signals, image signals, binary data signals, text data signals, and the like. Although distortion would be somewhat acceptable as regards the speech and the image signals on reproduction thereof, no distortion is acceptable as regards the binary and the text data signals. Therefore, a compression and expansion technique should be used which causes no distortion to occur when an original data signal is reproduced by expanding a compressed data sequence. In other words, the compression and expansion technique must be noise-free and must enable reversible compression.

Moreover, consideration might be made about a two-path method which carries out compression after counting a frequency of appearance or occurrence of each character pattern of input data signals. With this structure, an extra buffer memory should be prepared to memorize the input data signals. This means that the two-path method can not be available so as to reduce a memory capacity because the extra buffer memory brings about an increase of the memory capacity of a buffer memory.

Taking the above into consideration, a sequence of input data signals should be successively compressed through a single path. To this end, a Lempel-Ziv method is used in the terminal adapter illustrated in FIG. 2, as an adaptive code compression method or the predetermined compression method which satisfies the above-mentioned conditions. Such an adaptive code compression method carries out a coding operation by simultaneously extracting a statistical property of the input data signals which are being successively received. In addition, the method has a property in that the coding operation can be finished simultaneously with completion of reception of the input data sequence. A code which is obtained by the above-mentioned coding operation may be called an adaptive code.

Let a universal code be considered as one of the adaptive codes. Such a universal code can carry out an ideal coding operation such that an average code length gradually converges into entropy inherent to an information source with an increase of a code length even on the condition that a statistical property of the information source is not known at all. This shows that ideal compression can be accomplished by the use of the universal code.

Herein, it is known that the Lempel-Ziv method carries out the adaptive code compression by a Lempel-Ziv code which is typical of the universal codes. Specifically, when a character pattern in question is identical with a past character pattern which already appeared in the past, recordation is made in the Lempel-Ziv method as regards a pointer indicative of a past location of the past character pattern, information indicative of a character number of the same characters from the past location, and an initial character pattern which is not identical with the past character pattern.

Referring to FIGS. 7(A) and 7(B), description will be made about a basic LZ method which can be used in the first and the second data compression circuits 312 and 352. In FIG. 7(A), it is assumed that only two characters A and B repeatedly appear at character positions 1 through 18, as numbered over the characters A and B in FIG. 7(A), and form a character sequence of the two characters A and B. The character sequence is successively divided into a plurality of character groups or patterns, as depicted at a, b, .. ., h in FIG. 7(A). Such division of characters is based on the rule that a new character is successively registered in the form of a table as shown in FIG. 7(B) and a new combination of characters is registered in the form of a combination of a previous registered character and a following character.

More specifically, a leading or new character, namely, A at the character position 1 is at first detected as the character group (a) while the next character B is also detected as the character group (b). A combination of B and A at the positions 3 and 4 is detected as a new combination of the previous character B and a new character A and forms the character group (c). Likewise, a combination of A and A at the positions 5 and 6 is detected as a new combination of the previous character A and a new character B and forms the character group (d) while a combination of ABA at the positions 7, 8, and 9 is detected as a previous combination of the characters A and B at the locations 1 and 2 and a new character A and forms the character group (e). In addition, a combination of B, B, and B at the positions 10, 11, and 12 is detected as a previous combination of the characters B and B at the positions 2 and 3 and a following new character B and forms the character group (f) while a combination of AABB at the positions 13 through 16 is detected as a previous combination of three characters AAB at the positions 6, 7, and 8 and a new character B and forms the character group (g). Similar operation is repeated in connection with the following pattern of characters.

In FIG. 7(B), registered codes are illustrated to specify the character groups or patterns (a) through (g), as mentioned above. For example, the character group (f) is defined by the combination of two characters from the position 2 and the character B and is represented by a code (2, 2, B) while the character group (g) is defined by the combination of three characters from the position 6 with the character B and is represented by a code (6, 3, B). Such codes are memorized into each of the first and the second buffer memories 22 and 27 as the compressed data signals.

Although the above-description is made on the assumption that only the two characters A and B appear for brevity of description, a coding operation is practically carried out in connection with each of 256 characters represented by a single byte, namely, eight bits. The pointer may be representative of a relative position where the same pattern appears, instead of the start position. With this method, it is possible to reduce a memory capacity of each of the first and the second buffer memories 22 and 27 to a half of the memory capacity of each conventional buffer memory.

Referring to FIGS. 8(A) and 8(B), description will be made as regards a modification of the LZ method which is known as an increment parsing method. In the increment parsing method, a past character pattern is recurrently analyzed or parsed into a combination of a further past character pattern plus a single character. In addition, codes are produced by partitioning a character pattern into a plurality of groups and are compiled into a plurality of tables to which a plurality of pointers correspond.

Specifically, the character pattern is partitioned so that a combination of a registered table and a single character forms a new table. In FIG. 8(A), character patterns of "A" and "B" which appear at the beginning of the illustrated character pattern are memorized into first and second tables T1 and T2, as shown in FIG. 8(B). A following character pattern of BA is parsed into the character pattern B (already registered in the table T2) and the following character pattern "A" and is registered in the form of a third table T3. Therefore, a code (T2, A) is recorded in the third table T3, as illustrated in FIG. 8(B). Thus, a next following table is compiled with reference to past tables. For example, a sixth table T6 is specified by a code (T5+B). In this case, the fifth table T5 is further specified by a code (T1+B), as shown in FIG. 5(B).

From this fact, it is readily understood that a character pattern to be coded gradually becomes long in the modified LZ method and that the method in question is therefore called the increment parsing method.

On decoding the above-mentioned codes, a decoded character pattern also gradually becomes long. For instance, the sixth table T6 is composed of the fifth table T5 and the character pattern B while the fifth table T5 is further parsed into the first table T1 and the character pattern B.

Referring to FIG. 9, description will be made as regards another modification of an LZ method that will be called an LZW (Lempel-Ziv-Welch) method. The LZW method serves to omit recordation of a new character from a combination of the table numbers and the new character that is illustrated in FIG. 8(B). For example, it is assumed that "A" and "B" are already registered in tables T1 and T2, respectively. At first, the character pattern is parsed into a registered character pattern plus a single character, like in the LZ method. Since the first character "A" is registered, as mentioned above, a character pattern "AB" is extracted from a character sequence and is recognized as the combination of the table T1 and the character "B". In this event, the table number "1" assigned to the table T1 alone is recorded in a table T3 which is specified by a table number 3 in FIG. 9.

Thereafter, extraction is made from the new character "B" which is newly added in the preceding procedure and which appears at the end of the preceding procedure. As a result, a character pattern "BB" is extracted from the character sequence and is composed of a combination of the second table and "B". In this case, the table number 2 assigned to the second table is recorded in a table T4 which has a content of "BB". This shows that the table T4="BB" is registered and the table number 2 is recorded.

Next, a character pattern "BA" is extracted from the character sequence and is specified by a combination of the table 2 and the character pattern or character "B". Therefore, a table T5="BA" is registered on one hand and the table number 2 is recorded. Likewise, a following character pattern "AA" is extracted from the character sequence and is specified by a combination of the table T1 and the character "A". As a result, a table 6="AA" is registered as a content of the table 6 and the table number 1 is recorded. Subsequently, a next character pattern "AAA" is extracted from the character sequence and is equal to the content of the table 6 and the character "A". As a result, a table 7="AAA" is registered as a content of the table 7 and the table number 6 is recorded. Similar procedure is repeated in connection with the following character patterns. At any rate, it is possible to omit recordation of a new character, namely, plus one character in the LZW method, as mentioned above. This is because, on extracting each character pattern from a character sequence, a shift operation is executed with one single character extracted twice from the character sequence. Such codes can be readily and correctly decoded by compiling tables in a manner similar to those compiled on coding.

Alternatively, data compression may be carried out by the use of an LZSS (Lempel-Ziv-Stoer-Szymanski) method which is a modification and improvement of the LZ method. In this method, when a past character pattern is coded by the use of a pointer position and a length to produce a code and the code has a length longer than an original character pattern, such an original character pattern is subjected to no compression and is generated without being coded.

According to the LZSS method, a compression efficiency is improved as compared with the LZW method by selecting a relationship between a desired bit number for each character and a desired character pattern.

When the LZ method and the modified LZ methods mentioned before are used for data compression, it is possible to compress an amount of data to 50% or so and to therefore reduce a memory capacity of each of the first and the second buffer memories 22 and 27 to 50% or so.

While this invention has thus far been described in conjunction with a preferred embodiment thereof, it will be readily possible for those skilled in the art to put this invention into practice in various other manners. For example, the adaptive code compression method may be a dynamic Huffman code method wherein data compression is carried out by preparing a probability table and renewing the probability table. In addition, the first and the second packet type detectors 311 and 351 may not always be included in the first and the second data compression units 31 and 35 illustrated in FIG. 2.

What is claimed is:

1. A terminal adapter located between a data terminal equipment unit and a data communication network, said terminal adapter being operable to receive a sequence of first data Signals at a first transmission rate from said data terminal equipment unit to transmit a sequence of first network data Signals to said data communication network at a second transmission rate greater than said first transmission rate, said terminal adapter comprising:

a preprocessing circuit supplied with said first data Signal sequence for preprocessing said first data signal sequence into a sequence of first preprocessed signals;

signal compression means for compressing said first preprocessing signal sequence into a sequence of compressed signals in accordance with a predetermined compression algorithm;

a buffer memory for memorizing said compressed signal sequence;

controllable signal expansion means coupled to said buffer memory for expanding said compressed signal sequence read out of said buffer memory to produce a sequence of expanded signals at said second transmission rate; and a post-processing circuit supplied with said expanded signal sequence for post-processing said expanded signal sequence to produce a sequence of first post-processed signals as said first network data signal sequence;

said signal compression means including:

a detecting circuit supplied with said first preprocessed signal sequence for detecting whether or not said first preprocessed signal sequence is subjected to compression and expansion, to produce a compression indication signal and an expansion indication signal when said first preprocessed signal sequence is to be compressed and expanded, respectively; and a signal compression circuit supplied with said first preprocessed signal sequence and said compression indication signal for compressing said first preprocessed signal sequence in accordance with said predetermined compression algorithm to produce said compressed signal sequence when the compression indication signal is given from said detection circuit to said signal compression circuit;

said signal expansion means being supplied with said expansion indication signal and the readout compressed signal sequence to produce said expanded signal sequence in response to said expansion indication signal.

2. A terminal adapter as claimed in claim 1, wherein said detection circuit includes:

means for generating a predetermined signal sequence;

a comparing circuit supplied with said first preprocessed signal sequence with said predetermined signal sequence for comparing said first preprocessed signal sequence with said predetermined signal sequence to produce said compression indication signal only on coincidence between said first preprocessed signal sequence and said predetermined signal sequence;

means for supplying said signal compression circuit with said compression indication signal; and an expansion indication signal circuit connected to said comparing circuit for supplying said signal expansion means with said expansion indication signal which results from said compression indication signal.

3. A terminal adapter as claimed in claim 2, wherein said expansion indication signal circuit includes:

a first signal end detector coupled to said signal compression circuit for detecting an end of said compressed signal sequence to produce a first end signal representative of said end of the compressed signal sequence;

a second signal end detector coupled to said buffer memory for detecting an end of the readout compressed signal sequence to produce a second end signal representative of the end of the readout compressed signal sequence; and an expansion signal producing circuit connected to said first and said second signal end detectors and said comparing circuit for producing said expansion indication signal in response to said first and said second end signals and said compression indication signal.

4. A terminal adapter as claimed in claim 1, wherein said predetermined compression algorithm is determined by a selected one of a Lempel-Ziv method, a Lempel-Ziv-Welch method, and a Lempel-Ziv-Stoer-Szymanski method.

5. A terminal adapter located between a data terminal equipment unit and a data communication network, said terminal adapter being operable to receive a sequence of network data signals at a network transmission rate from the data communication network to transmit a sequence of terminal data signals at a terminal transmission rate slower than said network transmission rate, said terminal adapter comprising:

a preprocessing circuit supplied with said network data signal sequence for preprocessing said network data signal sequence into a sequence of preprocessed signals having said network transmission rate;

signal compression means for compressing said preprocessed signal sequence into a sequence of compressed signals in accordance with a predetermined compression algorithm;

a buffer memory for memorizing said compressed signal sequence;

controllable signal expansion means coupled to said buffer memory for expanding said compressed signal sequence read out of said buffer memory to produce a sequence of expanded signal sequences at said terminal transmission rate; and a post-processing circuit supplied with said expanded signal sequence for post-processing said expanded signal sequence to produce a sequence of post-processed signals as said terminal data signal sequence;

said signal compression means including:

a detecting circuit supplied with said preprocessed signal sequence for detecting whether or not said preprocessed signal sequence is subjected to compression and expansion, to produce a compression indication signal and an expansion indication signal when said preprocessed signal sequence is to be compressed and expanded, respectively; and a signal compression circuit supplied with said first preprocessed signal sequence and said compression indication signal for compressing said preprocessed signal sequence in accordance with said predetermined compression algorithm to produce said compressed signal sequence when the compression indication signal is given from said detection circuit to said signal compression circuit;

said signal expansion means being supplied with said expansion indication signal and the readout compressed signal sequence to produce said expanded signal sequence in response to said expansion indication signal.

6. A terminal adapter as claimed in claim 5, wherein said detection circuit includes:

means for generating a predetermined signal sequence;

a comparing circuit supplied with said preprocessed signal sequence with said predetermined signal sequence for comparing said preprocessed signal sequence with said predetermined signal sequence to produce said compression indication signal only on coincidence between said preprocessed signal sequence and said predetermined signal sequence;

means for supplying said signal compression circuit with said compression indication signal; and an expansion indication signal circuit connected to said comparing circuit for supplying said signal expansion means with said expansion indication signal which results from said compression indication signal.

7. A terminal adapter as claimed in claim 6, wherein said expansion indication signal circuit includes:

a first signal end detector coupled to said signal compression circuit for detecting an end of said preprocessed signal sequence to produce a first end signal representative of said end of the preprocessed signal sequence;

a second signal end detector coupled to said buffer memory for detecting an end of the readout compressed signal sequence to produce a second end signal representative of the end of the readout compressed signal sequence; and an expansion signal producing circuit connected to said first and said second signal end detectors and said comparing circuit for producing said expansion indication signal in response to said first and said second end signals and said compression indication signal.

8. A terminal adapter as claimed in claim 5, wherein said predetermined compression algorithm is determined by a selected one of a Lempel-Ziv method, a Lempel-Ziv-Welch method, and a Lempel-Ziv-Stoer-Szymanski method.

9. A terminal adapter located between a data terminal equipment unit and a data communication network, said terminal adapter being operable to receive a sequence of first terminal data signals at a first transmission rate from said data terminal equipment unit to transmit a sequence of first network data signals to said data communication network at a second transmission rate greater than said first transmission rate, said terminal adapter being also operable to receive a sequence of second network data signals at said second transmission rate from said data communication network to transmit a sequence of second terminal data signals to said data terminal equipment unit at said first transmission rate, said terminal adapter comprising:

a first preprocessing circuit supplied with said first terminal data signal sequence for preprocessing said first terminal data signal sequence into a sequence of first preprocessed signals;

first signal compression means for compressing said first preprocessed signal sequence into a sequence of first compressed signals in accordance with a predetermined compression algorithm;

a first buffer memory for memorizing said first compressed signal sequence;

first controllable signal expansion means coupled to said first buffer memory for expanding said first compressed signal sequence read out of said first buffer memory to produce a sequence of first expanded signals at said second transmission rate; and a first post-processing circuit supplied with said first expanded signal sequence for post-processing said first expanded signal sequence to produce a sequence of first post-processed signals as said first network data signal sequence;

said terminal adapter further comprising:

a second preprocessing circuit supplied with said second network data signal sequence for preprocessing said second network data signal sequence into a sequence of second preprocessed signals;

second signal compression means for compressing said second preprocessed signal sequence into a sequence of second compressed signals;

a second buffer memory for memorizing said second compressed signal sequence;

second controllable signal expansion means coupled to said second buffer memory for expanding said second compressed signal sequence read out of said second buffer memory to produce a sequence of second expanded signal at the first transmission rate; and a second post-processing circuit supplied with said second expanded signal sequence for post-processing said second expanded signal sequence to produce a sequence of second post-processed signals as said second terminal data signal sequence;

said first signal compression means including:

a first detecting circuit supplied with said first preprocessed signal sequence for detecting whether or not said first preprocessed signal sequence is subjected to compression and expansion, to produce a first compression indication signal and a first expansion indication signal when said first preprocessed signal sequence is to be compressed and expanded, respectively; and a first signal compression circuit supplied with said first preprocessed signal sequence and said compression indication signal for compressing said first preprocessed signal sequence in accordance with said predetermined compression algorithm to produce said first compressed signal sequence when the compression indication signal is given from said detection circuit to said signal compression circuit;

said first controllable signal expansion means being supplied with said first expansion indication signal and the first readout compressed signal sequence to produce said first expanded signal sequence in response to said expansion indication signal;

said second signal compression means including:

a second detecting circuit supplied with said second preprocessed signal sequence for detecting whether or not said second preprocessed signal sequence is subjected to compression and expansion, to produce a second compression indication signal and a second expansion indication signal when said second preprocessed signal sequence is to be compressed and expanded, respectively; and a second signal compression circuit supplied with said second preprocessed signal sequence and said second compression indication signal for compressing said second preprocessed signal sequence in accordance with said predetermined compression algorithm to produce said second compressed signal sequence when the second compression indication signal is given from said second detection circuit to said second signal compression circuit;

said second controllable signal expansion means being supplied with said second expansion indication signal and the first readout compressed signal sequence to produce said second expanded signal sequence in response to said second expansion indication signal.

10. A terminal adapter as claimed in claim 9, wherein said first detection circuit includes:

first means for generating a predetermined signal sequence;

a first comparing circuit supplied with said first preprocessed signal sequence with said predetermined signal sequence for comparing said first preprocessed signal sequence with said predetermined signal sequence to produce said first compression indication signal only on coincidence between said first preprocessed signal sequence and said predetermined signal sequence;

first supplying means for supplying said first signal compression circuit with said first compression indication signal; and a first expansion indication signal circuit connected to said first comparing circuit for supplying said first signal expansion means with said first expansion indication signal which results from said first compression indication signal;

said second detection circuit includes:

second means for generating a predetermined signal sequence;

a second comparing circuit supplied with said second preprocessed signal sequence with said predetermined signal sequence for comparing said second preprocessed signal sequence with said predetermined signal sequence to produce said second compression indication signal only on coincidence between said second preprocessed signal sequence and said predetermined signal sequence;

second supplying means for supplying said second signal, compression circuit with said second compression indication signal; and a second expansion indication signal circuit connected to said second comparing circuit for supplying said second signal expansion means with said second expansion indication signal which results from said second compression indication signal.

11. A terminal adapter as claimed in claim 10, wherein said predetermined compression algorithm is determined by a selected one of a Lempel-Ziv method, a Lempel-Ziv-Welch method, and a Lempel-Ziv-Stoer-Szymanski method.

12. A terminal adapter located between a data terminal equipment unit and a data communication network, said terminal adapter being operable to receive a sequence of first data signals at a first transmission rate from said data terminal equipment unit to transmit a sequence of first network data signals to said data communication network at a second transmission rate greater than said first transmission rate, said terminal adapter comprising:

a preprocessing circuit supplied with said first data signal sequence for preprocessing said first data signal sequence into a sequence of first preprocessed signals;

a signal compressor for compressing said first preprocessing signal sequence into a sequence of compressed signals in accordance with a predetermined compression algorithm;

a buffer memory for memorizing said compressed signal sequence;

a controllable signal expander coupled to said buffer memory for expanding said compressed signal sequence read out of said buffer memory to produce a sequence of expanded signals at said second transmission rate; and a post-processing circuit supplied with said expanded signal sequence for post-processing said expanded signal sequence to produce a sequence of first post-processed signals as said first network data signal sequence;

said signal compressor including:

a detecting circuit supplied with said first preprocessed signal sequence for detecting whether or not said first preprocessed signal sequence is subjected to compression and expansion, to produce a compression indication signal and an expansion indication signal when said first preprocessed signal sequence is to be compressed and expanded, respectively; and a signal compression circuit supplied with said first preprocessed signal sequence and said compression indication signal for compressing said first preprocessed signal sequence in accordance with said predetermined compression algorithm to produce said compressed signal sequence when the compression indication signal is given from said detection circuit to said signal compression circuit;

said signal expander being supplied with said expansion indication signal and the readout compressed signal sequence to produce said expanded signal sequence in response to said expansion indication signal.

13. A terminal adapter as claimed in claim 12, wherein said detection circuit includes:

a generator for generating a predetermined signal sequence;

a comparing circuit supplied with said first preprocessed signal sequence with said predetermined signal sequence for comparing said first preprocessed signal sequence with said predetermined signal sequence to produce said compression indication signal only on coincidence between said first preprocessed signal sequence and said predetermined signal sequence;

a supply device for supplying said signal compression circuit with said compression indication signal; and an expansion indication signal circuit connected to said comparing circuit for supplying said signal expander with said expansion indication signal which results from said compression indication signal.

14. A terminal adapter as claimed in claim 13, wherein said expansion indication signal circuit includes:

a first signal end detector coupled to said signal compression circuit for detecting an end of said compressed signal sequence to produce a first end signal representative of said end of the compressed signal sequence;

a second signal end detector coupled to said buffer memory for detecting an end of the readout compressed signal sequence to produce a second end signal representative of the end of the readout compressed signal sequence; and an expansion signal producing circuit connected to said first and said second signal end detectors and said comparing circuit for producing said expansion indication signal in response to said first and said second end signals and said compression indication signal.

15. A terminal adapter as claimed in claim 12, wherein said predetermined compression algorithm is determined by a selected one of a Lempel-Ziv method, a Lempel-Ziv-Welch method, and a Lempel-Ziv-Stoer-Szymanski method.

16. A terminal adapter located between a data terminal equipment unit and a data communication network, said terminal adapter being operable to receive a sequence of network data signals at a network transmission rate from the data communication network to transmit a sequence of terminal data signals at a terminal transmission rate slower than said network transmission rate, said terminal adapter comprising:

a preprocessing circuit supplied with said network data signal sequence for preprocessing said network data signal sequence into a sequence of preprocessed signals having said network transmission rate;

a signal compressor for compressing said preprocessed signal sequence into a sequence of compressed signals in accordance with a predetermined compression algorithm;

a buffer memory for memorizing said compressed signal sequence;

a controllable signal expander coupled to said buffer memory for expanding said compressed signal sequence read out of said buffer memory to produce a sequence of expanded signal sequences at said terminal transmission rate; and a post-processing circuit supplied with said expanded signal sequence for post-processing said expanded signal sequence to produce a sequence of post-processed signals as said terminal data signal sequence;

said signal compressor including:

a detecting circuit supplied with said preprocessed signal sequence for detecting whether or not said preprocessed signal sequence is subjected to compression and expansion, to produce a compression indication signal and an expansion indication signal when said preprocessed signal sequence is to be compressed and expanded, respectively; and a signal compression circuit supplied with said first preprocessed signal sequence and said compression indication signal for compressing said preprocessed signal sequence in accordance with said predetermined compression algorithm to produce said compressed signal sequence when the compression indication signal is given from said detection circuit to said signal compression circuit;

said signal expander being supplied with said expansion indication signal and the readout compressed signal sequence to produce said expanded signal sequence in response to said expansion indication signal.

17. A terminal adapter as claimed in claim 16, wherein said detection circuit includes:
 a generator for generating a predetermined signal sequence;
 a comparing circuit supplied with said preprocessed signal sequence with said predetermined signal sequence for comparing said preprocessed signal sequence with said predetermined signal sequence to produce said compression indication signal only on coincidence between said preprocessed signal sequence and said predetermined signal sequence;
 a supply device for supplying said signal compression circuit with said compression indication signal; and
 an expansion indication signal circuit connected to said comparing circuit for supplying said signal expander with said expansion indication signal which results from said compression indication signal.

18. A terminal adapter as claimed in claim 17, wherein said expansion indication signal circuit includes;
 a first signal end detector coupled to said signal compression circuit for detecting an end of said preprocessed signal sequence to produce a first end signal representative of said end of the preprocessed signal sequence;
 a second signal end detector coupled to said buffer memory for detecting an end of the readout compressed signal sequence to produce a second end signal representative of the end of the readout compressed signal sequence; and
 an expansion signal producing circuit connected to said first and said second signal end detectors and said comparing circuit for producing said expansion indication signal in response to said first and said second end signals and said compression indication signal.

19. A terminal adapter as claimed in claim 16, wherein said predetermined compression algorithm is determined by a selected one of a Lempel-Ziv method, a Lempel-Ziv-Welch method, and a Lempel-Ziv-Stoer-Szymanski method.

20. A terminal adapter located between a data terminal equipment unit and a data communication network, said terminal adapter being operable to receive a sequence of first terminal data signals at a first transmission rate from said data terminal equipment unit to transmit a sequence of first network data signals to said data communication network at a second transmission rate greater than said first transmission rate, said terminal adapter being also operable to receive a sequence of second network data signals at said second transmission rate from said data communication network to transmit a sequence of second terminal data signals to said data terminal equipment unit at said first transmission rate, said terminal adapter comprising:
 a first preprocessing circuit supplied with said first terminal data signal sequence for preprocessing said first terminal data signal sequence into a sequence of first preprocessed signals;
 a first signal compressor for compressing said first preprocessed signal sequence into a sequence of first compressed signals in accordance with a predetermined compression algorithm;

a first buffer memory for memorizing said first compressed signal sequence;
 first controllable signal expander coupled to said first buffer memory for expanding said first compressed signal sequence read out of said first buffer memory to produce a sequence of first expanded signals at said second transmission rate; and
 a first post-processing circuit supplied with said first expanded signal sequence for post-processing said first expanded signal sequence to produce a sequence of first post-processed signals as said first network data signal sequence;

said terminal adapter further comprising:
 a second preprocessing circuit supplied with said second network data signal sequence for preprocessing said second network data signal sequence into a sequence of second preprocessed signals;
 a second signal compressor for compressing said second preprocessed signal sequence into a sequence of second compressed signals;
 a second buffer memory for memorizing said second compressed signal sequence;
 second controllable signal expander coupled to said second buffer memory for expanding said second compressed signal sequence read out of said second buffer memory to produce a sequence of second expanded signal at the first transmission rate; and
 a second post-processing circuit supplied with said second expanded signal sequence for post-processing said second expanded signal sequence to produce a sequence of second post-processed signals as said second terminal data signal sequence; said first signal compressor including:
 a first detecting circuit supplied with said first preprocessed signal sequence for detecting whether or not said first preprocessed signal sequence is subjected to compression and expansion, to produce a first compression indication signal and a first expansion indication signal when said first preprocessed signal sequence is to be compressed and expanded, respectively; and
 a first signal compression circuit supplied with said first preprocessed signal sequence and said compression indication signal for compressing said first preprocessed signal sequence in accordance with said predetermined compression algorithm to produce said first compressed signal sequence when the compression indication signal is given from said detection circuit to said signal compression circuit;

said first controllable signal expander being supplied with said first expansion indication signal and the first readout compressed signal sequence to produce said first expanded signal sequence in response to said expansion indication signal;

said second signal compressor including:
 a second detecting circuit supplied with said second preprocessed signal sequence for detecting whether or not said second preprocessed signal sequence is subjected to compression and expansion, to produce a second compression indication signal and a second expansion indication signal when said second preprocessed signal sequence is to be compressed and expanded, respectively; and
 a second signal compression circuit supplied with said second preprocessed signal sequence and said second compression indication signal for compressing said second preprocessed signal sequence in accordance with said predetermined compression algorithm to produce said second compressed signal sequence when the second compression indication signal is given from said second detection circuit to said second signal compression circuit;

said second controllable signal expander being supplied with said second expansion indication signal and the first readout compressed signal sequence to produce said second expanded signal sequence in response to said second expansion indication signal.

21. A terminal adapter as claimed in claim 20, wherein said first detection circuit comprises:

a first generator for generating a predetermined signal sequence;

a first comparing circuit supplied with said first preprocessed signal sequence with said predetermined signal sequence for comparing said first preprocessed signal sequence with said predetermined signal sequence to produce said first compression indication signal only on coincidence between said first preprocessed signal sequence and said predetermined signal sequence;

a first supply device for supplying said first signal compression circuit with said first compression indication signal; and a first expansion indication signal circuit connected to said first comparing circuit for supplying said first signal expander with said first expansion indication signal which results from said first compression indication signal;

said second detection circuit includes:

a second generator for generating a predetermined signal sequence;

a second comparing circuit supplied with said second preprocessed signal sequence with said predetermined signal sequence for comparing said second preprocessed signal sequence with said predetermined signal sequence to produce said second compression indication signal only on coincidence between said second preprocessed signal sequence and said predetermined signal sequence;

a second supply device for supplying said second signal compression circuit with said second compression indication signal; and a second expansion indication signal circuit connected to said second comparing circuit for supplying said second signal expander with said second expansion indication signal which results from said second compression indication signal.

22. A terminal adapter as claimed in claim 21, wherein said predetermined compression algorithm is determined by a selected one of a Lempel-Ziv method, a Lempel-Ziv-Welch method, and a Lempel-Ziv-Stoer-Szymanski method.

* * * * *